Feb. 2, 1954 J. H. HILLDALE 2,667,891
PRESSURE-OPERATED ACTUATING AND RELIEF VALVE
Filed March 22, 1948 2 Sheets-Sheet 2
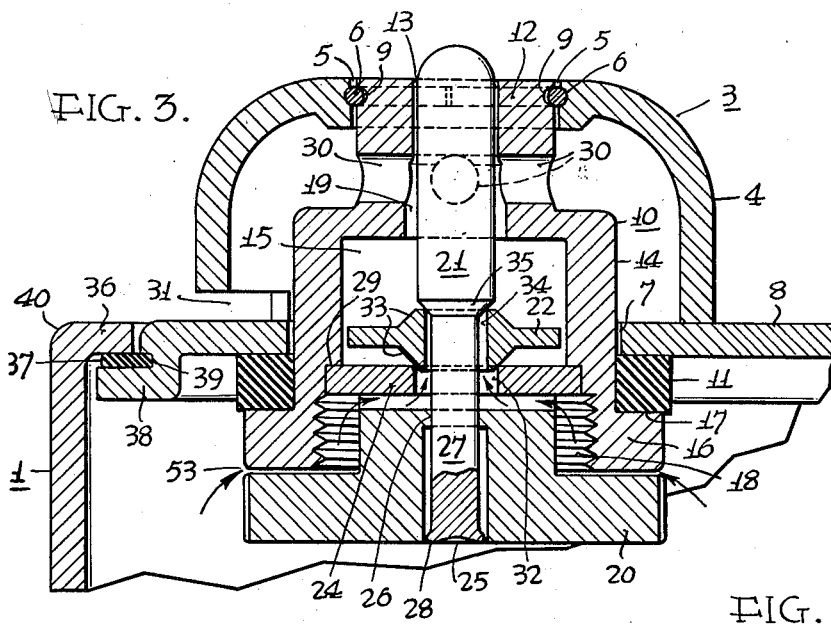
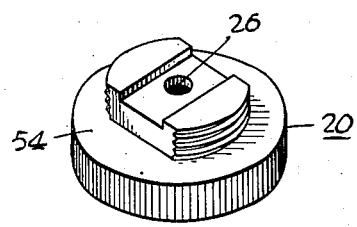
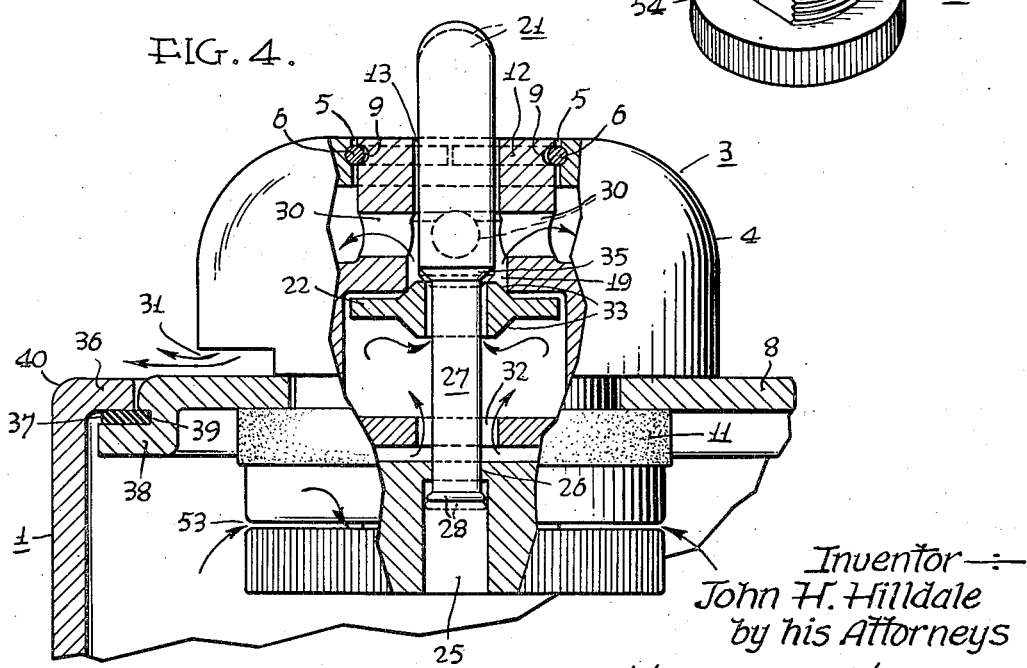
Inventor:—
John H. Hilldale
by his Attorneys
Howson & Howson Patented Feb. 2, 1954

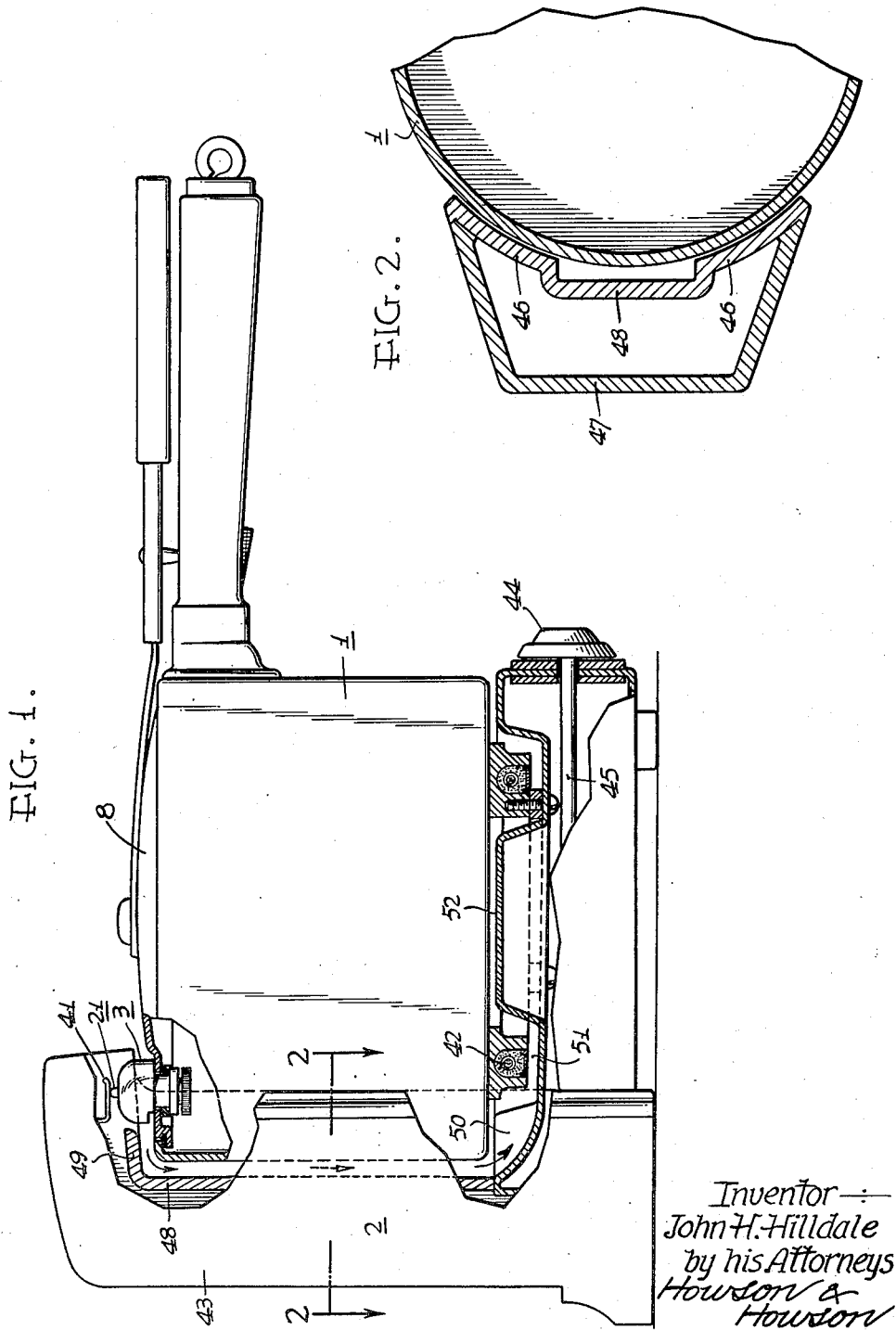

2,667,891

UNITED STATES PATENT OFFICE 2,667,891

PRESSURE-OPERATED ACTUATING AND RELIEF VALVE

John H. Hilldale, Philadelphia, Pa., assignor to Proctor Electric Company, Philadelphia, Pa., a corporation of Pennsylvania Application March 22, 1948, Serial No. 16,158

9 Claims. (Cl. 137—470)

This invention relates to pressure operated actuating devices which may be used in connection with pressure controlled containers such as pressure cookers. More specifically, the invention relates to new and useful improvements in automatic pressure cookers.

The principal object of this invention is the provision of an improved control actuating device, operated by the pressure within the cooking vessel, which also is adapted to maintain a predetermined pressure in the vessel during a cooking operation, and to vent the pressure at the end of such operation.

In an automatic pressure cooker of the type disclosed and claimed in the copending application of C. R. Turner and P. G. Turner, filed October 2, 1947, under Serial No. 777,496, now Patent Number 2,641,680, issued June 9, 1953, a pressure relief valve is shown by which the pressure in an associated cooking vessel is prevented from exceeding a predetermined amount by means of a spring-loaded venting piston or plate. This pressure relief valve also serves to actuate switching means in the cooperative control device to reduce the heat supplied to the cooking vessel and to actuate a timer whereby the cooking period shall be automatically terminated. The valve also serves to vent the pressure at the end of the cooking period.

While the multi-purpose actuating and relief valve shown in the above-mentioned application is generally satisfactory, it has certain minor defects which it is desired to overcome; and furthermore it has been found desirable to provide a generally improved structure from the standpoint of ease of manufacture and assembly.

It is a further object of this invention then, to provide a multi-purpose actuating and pressure relief valve having simple construction, capable of easy manufacture and assembly, and adapted to be operable with a minimum of parts.

A still further object is the provision of an improved actuating and pressure relief valve having a single member to actuate means in cooperation with the valve and to maintain a predetermined pressure within a pressure vessel without the use of incorporated springs.

In the pressure cooking device disclosed and described in the above-mentioned copending application, a feature is the provision of means associated with the control stand to collect steam vented from the cooking vessel at the termination of the cooking period and to direct it, in a closed channel, to the underside of the vessel where, with the air drawn into the collecting means by the vented steam jet, it cools the heating means. The collecting and directing means, which in the copending application comprise an open-ended funnel and a closed duct, are necessary where the venting orifice of the pressure relief valve is located some distance from the surface of the lid of the pressure vessel. It has been determined that when the orifice from which steam under pressure is vented is lowered to the surface of the lid of of the vessel and the orifice is directed tangentially of the surface, the expanding steam jet will follow the contour of the vessel even to the extent of making right angle changes of direction if the corner around which the jet is to blow is rounded.

It is a further object of this invention to provide venting means, in connection with a pressure relief valve, which will direct vented steam along the surface of a pressure vessel so as to cause the jet to remain close thereto.

The degree of boiling which occurs in a pressure cooking vessel will frequently raise small food particles to the level of the vent valve and deposit them in the steam conducting passages of the venting means. In previous pressure cookers, the clogging of the steam passages would render the venting and pressure relieving means inoperative, with the result that excessive pressures would be produced in the vessel. Another object of this invention is the provision of a novel type of strainer which shall prevent the deposition of food particles in the steam conducting passages of the pressure venting valve.

Other objects and features of the invention will be apparent from the following detailed description.

In the accompanying drawings:

Fig. 1 is a view, partly in elevation and partly in section, showing a pressure cooker equipped with the present valve device in cooperative association with control apparatus of the character shown in the above-mentioned application;

Fig. 2 is a fragmentary sectional view taken along line 2—2 of Fig. 1;

Fig. 3 is an enlarged vertical sectional view of the valve device;

Fig. 4 is a view similar to Fig. 3, showing the disposition of the various elements of the device when substantial pressure exists in the vessel; and Fig. 5 is a perspective view of the bottom plug of said device.

Referring first to Fig. 1, there is shown a pressure cooker 1 in cooperative association with a control device 2 of the character disclosed in the above-mentioned application. The general construction of the pressure cooker may be similar to that disclosed in the copending application of C. R. Turner, Serial No. 672,363, filed May 27, 1946, now Patent Number 2,570,993, issued October 9, 1951. The pressure cooker is provided with an actuating and pressure relief valve 3 which, in accordance with the present invention, is constructed and functions as hereinafter described.

The construction of the valve 3 is clearly shown in Fig. 3. A cover plate 4, having an opening 5 in which a relatively strong internal snap ring 6 is located, is positioned over an opening 7 in the lid 8 of the pressure cooker 1. Inserted through the opening 7, and retained therein by the engagement of the snap spring in a groove 9, is a valve body 10. A sealing gasket 11, of rubber or suitable compressible material, provides the seal for the opening 7 of the lid. The valve body comprises an upper section 12 having an upper bore 13, a central section 14 having a central bore 15, and a lower section 16 having a shoulder 17 and an internal threaded portion 18. The upper bore 13 and central bore 15 are in communication at 19. A lower plug 20 (see Fig. 5) is assembled with the valve stem 21, the piston plate 22 and the lower valve seat plate 24. A hole 25 in the plug, having a guide portion 26, is passed over the lower part 27 of the valve stem 21 after the piston plate 22 and lower valve seat plate are placed in the relation shown. By means of suitable upsetting tools, an upset portion 28 is made in the lower end of the valve stem such that it securely assembles the plug, valve stem, plate and piston together. By threaded insertion of the plug into the internal threaded section 18 of the valve body, the plate 24 is seated securely on the shoulder 29 of the valve body.

The depth of the threaded portion of the plug 20 is so determined that when the plug is threaded into the valve body to its maximum depth, there will be left between the lower shoulder 54 of the plug and the bottom of the valve body a narrow peripheral slot. This narrow slot in this embodiment, about .015 inch, provides a large total area for the passage of steam but will exclude all of the food particles of any objectionable size from the steam cylinder spaces. Thus the closely spaced surfaces forming the narrow slot constitute a strainer.

When no elevated pressure exists in the vessel 1, the elements assume gravitationally the positions shown in Fig. 3. In the upper section of the valve body there are a plurality of venting holes 30 in communication with the upper bore. A cut-out 31 in the cover plate 4 provides communication to the atmosphere from the interior of the valve. It should be noted that the lower boundary of the opening 31 is the top of the lid 8 of the cooking vessel. The cover plate is held securely against the lid by the resiliency of the gasket 11.

The lower valve seat plate 24, which is of circular shape, is held as mentioned, against the shoulder 29 by the top surface of the plug 20. A circular opening 32, appreciably larger than the diameter of the lower part 27 of the valve stem, is provided in the plate 24. The opening 32 is in communication with the interior of the cooking vessel by virtue of the formation of plug 20 as shown in Fig. 5. The piston plate 22 comprises a disk and central bossings 33 on either surface of the disk adapted to seat on and seal the openings 32 and 19. The central aperture 34 of the piston plate provides a further sealing seat for the conical shoulder 35 of the valve stem 21.

The opening 31 of the cover 4 is defined on its lower side, by the top of the lid 8 of the cooker 1. The lid is held, as described in the copending application Serial No. 674,707 of C. R. Turner, filed June 6, 1946, now Patent Number 2,619,982, issued December 2, 1952, against a peripheral lip 36 of the vessel 1. A gasket 37 is held on the flanged section 38 of the lid. A small under-cut 39 is made in the flanged section 38 to accommodate the gasket, which is slightly shorter in inner circumferential length than the distance around the lid at the under-cut 39. This permits the gasket, which may be of rubber or suitable synthetic material to be stretched and held in position by its own resiliency. The edge contour 40 of the vessel 1 is rounded, with a suitable radius, preferably not less than ¼".

Referring again to Fig. 1, as previously stated the control device 2 is of the general character disclosed in the above-mentioned Turner et al. application. For the present purpose, the following brief description of the device 2 will suffice.

A lever arm 41 actuated by the valve stem 21, controls circuit establishing switches (not visible) to vary the energization of the heating unit 42 and to initiate a timed cycle. At the end of said cycle, the arm 41 is caused to exert additional downward pressure on the valve stem to cause the pressure in the cooker to be vented. The control mechanism, with which we are not here concerned, is encased within the vertical column 43. Such mechanism is manually controllable, as regards the time duration of the cooking cycle, by means of the rotatable knob 44 and shaft 45.

In the device of the above-mentioned Turner et al. application, the steam from the pressure cooker is vented downward through a passage in the vertical column to the bottom of the cooker vessel and the heating unit. In accordance with a further feature of the present invention, the column 43 which is composed of a front section 46 (see Fig. 2) and a back section 47, is provided with a vertical recess 48.

As may be seen in Fig. 2, the column is shaped to closely fit the vessel 1 except at said recess. Thus the recess and the vessel form a passage. The front section 46 also has a flange 49 (Fig. 1) which projects beyond the edge of the vessel and forms, with the lid, a passage for steam vented from the valve 3. The vertical passage leads to an outlet passage 50 which extends to the circular recess 51 in the base wherein the heating means is disposed. The recess 51 is formed in the upper member 52 of the base by stamping in a suitable forming die. The heating elements are located so that the plane of the bottom of the vessel is slightly above that of the top of the member 52.

The operation of this pressure cooking device is, in all respects, similar to that of the above-mentioned Turner et al. application.

As the vessel 1 is placed on the heating means 42, the valve stem 21 is aligned with the lever 41 of the controls. The lever exerts a measured downward force on the valve stem by means of certain springs, not here shown. As the pressure builds up initially in the cooker under the heat from the heating means, that pressure is transmitted and applied to the piston plate 22 (Fig. 3) at the lower bossing 33. The communication from the interior of the cooking vessel to the piston plate is through the slot 53, past the cut-away sections of the threaded plug 20 to the orifice in the plate 24. As is shown in Fig. 3, the valve stem 21 rests on the piston plate 22. The diameter of the orifice of the plate 24 is so chosen with respect to the combined weight of the valve stem and piston plate and the measured downward force on the stem by the lever 41 so as to permit the raising of those two members from seating relationship on the plate 24 as the pressure in the vessel reaches a predetermined amount. As this seal is broken, the pressure from the interior of the cooker is applied on the lower surface of the piston plate which is of substantially greater area than the orifice in the plate 24. This sudden increase in vertically applied force immediately lifts the piston and valve stem to the position shown in Fig. 4, the valve stem being in the dotted line position. The upward movement of the valve stem causes actuation of the control lever 41 as above mentioned. In this position the upper boss of the piston plate 22 sealingly seats on the opening 19 of the upper valve body. The weight of the valve stem 21 and the downward force thereon, considered with the diameter of the opening 34 in the piston plate 22, are ample to retain the valve stem in sealing relationship on the piston plate at 35.

In the event of a pressure in the pressure vessel which exceeds a second predetermined amount, the valve stem will lift to the full line position of Fig. 4. This will prevent pressure in the vessel from exceeding the second predetermined value. The lifting of the valve stem from the piston plate permits steam to flow through the hole 34, out the openings 30 in the upper valve body and through the vent opening 31.

At the end of the timed cooking period, the lever arm 41 is forced downward against the top of the valve stem 21. The consequent downward motion of the valve stem causes like motion of the piston plate 22, by virtue of the tapered section 35 of the valve stem. The distance of downward motion is such that the seal of the piston plate at 19 is broken but not enough to seal the plate on the opening in plate 24. Thus the pressure is permitted to escape from the vessel, around the piston plate, through the openings 30 and 31 at substantially the constant optimum rate.

As hereinbefore mentioned, the opening 31 is at the surface of the lid of the vessel. As steam is vented from the cooker vessel it jets from the opening 31 tangentially to the surface of the lid. The internal static pressure in the jet, at high pressures in the vessel, is such that the jet will follow moderate changes of surface along which it is streaming. This principle, first propounded by Bernoulli, is well known in hydrodynamics and to those skilled in the arts of aerodynamics. The steam jet will follow around the rounded edge 40 of the vessel and will be directed downward in the channel 43 to the outlet passage 50 beneath the vessel. As disclosed in the abovementioned Turner et al. application, this vented steam, when impinged on the heating elements 42, aids in cooling them, which in turn accelerates the cooling of the vessel.

From the foregoing description it will be seen that the present invention has provided a multipurpose device which is simple in construction and may be easily manufactured and assembled, and which is free of any springs or other elements which tend to get out of adjustment.

It also will be seen that there is provided a device which may be easily disassembled for cleaning by a housewife and which has all the components secured together in a manner as to make improper re-assembly impossible. Further, it will be seen that the disassembly of the valve parts also exposes the straining surfaces, so that the elements of the pressure retaining and venting valve and the associated strainer may be cleaned together. Thus by merely backing out the plug 20, it is possible to remove the assembly comprising the plug, plate 24, piston plate 22 and valve stem 21, and yet the elements of said assembly are held loosely together.

The term "pressure source" as used in the claims is intended to be limited to a pressure cooker of the general type hereinbefore described. The valve device provided by this invention and defined in the claims is a special purpose device for the performance of functions inherent in a pressure cooking operation.

While a particular embodiment has been shown and described, the invention is not limited thereto but contemplates such modifications as may occur to those skilled in the art.

I claim:

1. In a pressure venting valve device for use with a pressure source of the character described, a casing structure having inlet and outlet ports and having an inlet end portion of substantial peripheral dimension, a plug removably attached to said structure and forming therewith a narrow passage at said end portion extending inwardly from the entire periphery thereof to the inlet port for introducing pressure of said source to the interior of said structure, and pressure-operable movable valve means within said structure movable between said ports and operable by pressure introduced through said narrow passage.

2. In a pressure venting valve device for use with a pressure source, a valve body adapted to be secured to a supporting member, said body defining a valve chamber in communication with said source and having a port in communication with the atmosphere, pressure-operable movable valve means in said chamber adapted to seal and unseal said port in response to predetermined pressures of said source, and a member loosely connected to said valve means and detachably secured to said body and forming with the latter a narrow filter passage through which said chamber is in communication with said source.

3. In a pressure venting valve device for use with a pressure source, a valve body adapted to be secured to a supporting member, said body defining a valve chamber in communication with the atmosphere, an apertured piston plate freely movable in said chamber, a valve stem extending within said chamber through the aperture in said plate, said piston plate and said valve stem serving cooperatively to seal and unseal said port in response to predetermined pressures of said source, and a plug loosely connected to said valve stem and threadedly secured to said body, said plug and said body having closely-spaced surfaces forming a narrow filter passage through which said chamber is in communication with said source.

4. In a pressure venting valve device for use with a pressure source, said device including a centrally disposed chamber in communication with said source, a port in said chamber in communication with the atmosphere, movable members in said chamber adapted to seal and unseal said port on attainment of predetermined pressures of said source, a strainer comprising two closely-spaced surfaces having a narrow peripheral opening, and means near the center of said surfaces for communicating pressure from said source through said opening to said members within said chamber.

5. A valve device for use on a pressure vessel to signal attainment of a predetermined pressure therein and to vent excess pressure and also to effect substantially full venting of the pressure, said device comprising a chamber having a pressure inlet port of substantially smaller area than the transverse area of said chamber and a pressure outlet port in communication with the atmosphere, a plate in said chamber movable between said ports and engageable therewith, said plate being only slightly smaller in periphery than the transverse area of said chamber to provide a small space between the periphery of said plate and the inner wall of the chamber, said plate having an aperture therein of smaller area than said inlet port whereby a relatively small area of the plate is exposed to pressure when the plate is engaged with said inlet port, and a movable element in said chamber normally closing said aperture and cooperative with said plate initially to close said inlet port, said element extending externally of said chamber for subjection to an external force, whereby increase of pressure to a value determined by said force first causes slight movement of said plate and said element with consequent exposure of the entire relatively large area of said plate to the pressure, whereupon said plate and said element are instantaneously moved to a position to seal said outlet port without appreciable loss of pressure about the periphery of the plate, said element being further actuated by excess pressure to uncover said aperture and thus vent the excess pressure through said outlet port, said plate being movable away from said outlet port by said element upon increase of said external force to vent the pressure through the small space between the periphery of said plate and the inner wall of said chamber.

6. A valve device for use on a pressure vessel to signal attainment of a predetermined pressure therein and to vent excess pressure and also to effect substantially full venting of the pressure, said device comprising a chamber having a pressure inlet port of substantially smaller area than the transverse area of said chamber and a pressure outlet port in communication with the atmosphere, a plate in said chamber movable between said ports and engageable therewith, said plate being only slightly smaller in periphery than the transverse area of said chamber to provide a small space between the periphery of said plate and the inner wall of the chamber, said plate having an aperture therein of smaller area than said inlet port whereby a relatively small area of the plate is exposed to pressure when the plate is engaged with said inlet port, and a movable element in said chamber extending through said aperture and through said inlet port and having a portion normally closing said aperture and cooperative with said plate initially to close said inlet port, said element extending externally of said chamber for subjection to an external force, whereby increase of pressure to a value determined by said force first causes slight movement of said plate and said element with consequent exposure of the entire relatively large area of said plate to the pressure, whereupon said plate and said element are instantaneously moved to a position to seal said outlet port without appreciable loss of pressure about the periphery of the plate, said element being further actuated by excess pressure to uncover said aperture and thus vent the excess pressure through said outlet port, said plate being movable away from said outlet port by said element upon increase of said external force to vent the pressure through the small space between the periphery of said plate and the inner wall of said chamber.

7. A valve device for use on a pressure vessel to signal attainment of a predetermined pressure therein and to vent excess pressure and also to effect substantially full venting of the pressure, said device comprising a chamber having a pressure inlet port of substantially smaller area than the transverse area of said chamber and a pressure outlet port in communication with the atmosphere, a plate in said chamber movable between said ports and engageable therewith, said plate being only slightly smaller in periphery than the transverse area of said chamber to provide a small space between the periphery of said plate and the inner wall of the chamber, said plate having an aperture therein of smaller area than said inlet port whereby a relatively small area of the plate is exposed to pressure when the plate is engaged with said inlet port, and a movable stem in said chamber normally closing said aperture and cooperative with said plate initially to close said inlet port, said stem extending externally of said chamber for subjection to an external force, whereby increase of pressure to a value determined by said force first causes slight movement of said plate and said stem with consequent exposure of the entire relatively large area of said plate to the pressure, whereupon said plate and said stem are instantaneously moved to a position to seal said outlet port without appreciable loss of pressure about the periphery of the plate, said stem being further actuated by excess pressure to uncover said aperture and thus vent the excess pressure through said outlet port, said plate being movable away from said outlet port by said stem upon increase of said external force to vent the pressure through the small space between the periphery of said plate and the inner wall of said chamber.

8. A valve device for use on a pressure vessel to signal attainment of a predetermined pressure therein and to vent excess pressure and also to effect substantially full venting of the pressure, said device comprising a chamber having a pressure inlet port of substantially smaller area than the transverse area of said chamber and a pressure outlet port in communication with the atmosphere, a plate in said chamber movable between said ports and engageable therewith, said plate being only slightly smaller in periphery than the transverse area of said chamber to provide a small space between the periphery of said plate and the inner wall of the chamber, said plate having an aperture therein of smaller area than said inlet port whereby a relatively small area of the plate is exposed to pressure when the plate is engaged with said inlet port, and a movable stem in said chamber extending through said aperture and through said inlet port and having a portion normally closing said aperture and cooperative with said plate initially to close said inlet port, said stem extending externally of said chamber for subjection to an external force, whereby increase of pressure to a value determined by said force first causes slight movement of said plate and said stem with consequent exposure of the entire relatively large area of said plate to the pressure, whereupon said plate and said stem are instantaneously moved to a position to seal said outlet port without appreciable loss of pressure about the periphery of the plate, said stem being further actuated by excess pressure to uncover said aperture and thus vent the excess pressure through said outlet port, said plate being movable away from said outlet port by said stem upon increase of said external force to vent the pressure through the small space between the periphery of said plate and the inner wall of said chamber.

9. A valve device for use on a pressure vessel to signal attainment of a predetermined pressure therein and to vent excess pressure and also to effect substantially full venting of the pressure, said device comprising a chamber having a pressure inlet port of substantially smaller area than the transverse area of said chamber and a pressure outlet port in communication with the atmosphere, said chamber being formed in part by a removable member in which said inlet port is provided, a plug removably securing said member in place, a plate in said chamber movable between said ports and engageable therewith, said plate being only slightly smaller in periphery than the transverse area of said chamber to provide a small space between the periphery of said plate and the inner wall of the chamber, said plate having an aperture therein of smaller area than said inlet port whereby a relatively small area of the plate is exposed to pressure when the plate is engaged with said inlet port, and a movable stem in said chamber extending through said aperture and said inlet port and loosely connected to said plug, the latter permitting limited movement of the stem, said stem having a shoulder normally closing said aperture and cooperative with said plate initially to close said inlet port, said stem extending externally of said chamber for subjection to an external force, whereby increase of pressure to a value determined by said force first causes slight movement of said plate and said stem with consequent exposure of the entire relatively large area of said plate to the pressure, whereupon said plate and said stem are instantaneously moved to a position to seal said outlet port without appreciable loss of pressure about the periphery of the plate, said stem being further actuated by excess pressure to uncover said aperture and thus vent the excess pressure through said outlet port, said plate being movable away from said outlet port by said stem upon increase of said external force to vent the pressure through the small space between the periphery of said plate and the inner wall of said chamber.

JOHN H. HILLDALE.

References Cited in the file of this patent

UNITED STATES PATENTS

| Number | Name | Date |
|--------|------|------|
| 832,274 | Probst | Oct. 2, 1906 |
| 1,319,112 | Raines | Oct. 12, 1919 |
| 1,638,589 | Louw | Aug. 9, 1926 |
| 1,799,998 | Zwicky | Apr. 7, 1931 |
| 1,847,068 | Campbell | Mar. 1, 1932 |
| 1,890,870 | Tokheim | Dec. 13, 1932 |
| 1,935,108 | Brooks | Nov. 14, 1933 |
| 1,935,815 | Piro | Nov. 21, 1933 |
| 2,200,903 | Stephens | May 14, 1940 |
| 2,241,137 | Jonas | May 6, 1941 |
| 2,349,137 | Brown | May 16, 1944 |
| 2,422,237 | Hansen | June 17, 1947 |
| 2,428,483 | Wittenberg | Oct. 7, 1947 |

FOREIGN PATENTS

| Number | Country | Date |
|--------|---------|------|
| 515,231 | Great Britain | of 1939 |